United States Patent Office 3,840,569
Patented Oct. 8, 1974

3,840,569
N¹-ARYLOXY(ARYLTHIO) DINITRO-
SULFANILAMIDES
James R. Beck, Indianapolis, Ind., assignor to Eli Lilly
and Company, Indianapolis, Ind.
No Drawing. Filed Nov. 13, 1972, Ser. No. 306,128
Int. Cl. C07c 143/80
U.S. Cl. 260—397.7 R          6 Claims

ABSTRACT OF THE DISCLOSURE

A defined class of novel N¹-aryloxy-, arylthio-, and hydroxy - N⁴ - substituted-3,5-dinitrosulfanilamides are effective herbicides.

BACKGROUND OF THE INVENTION

Organic chemical herbicides have been under study and in agricultural use since the invention of 2,4-D a generation ago. Increasingly sophisticated chemical and biological research has discovered many useful classes of organic chemical herbicides. The extremely rapid growth of knowledge in the field has led to the production of herbicidal compounds which are capable of highly selective control of undesirable plants in ornamental and crop plantings.

The benzenesulfonamides have been considered as selective herbicides. For example, Soper, U.S. Pat. 3,367,-949, and Kaplan, U.S. Pat. 3,555,055, made discoveries in the field of sulfanilamide herbicides. Soloway, U.S. Pat. 3,227,734, disclosed related herbicidal methylsulfonylanilines. The compounds of those investigators, however, were too phytotoxic for use in some ornamental and crop species.

The dinitroaniline compounds disclosed by the following inventors, while quite distinct from the compounds of the present invention, are exemplary of herbicides derived from the dinitrobenzene nucleus.

Soper, U.S. Pat. 3,403,180
Soper, U.S. Pat. 3,111,403
Soper, U.S. Pat. 3,257,190
Maravetz, U.S. Pat. 3,686,230
Maravetz, U.S. Pat. 3,672,864
Hunter et al., U.S. Pat. 3,617,251

SUMMARY

I now disclose novel N⁴-substituted-3,5-dinitrosulfanilamides which possess N¹-hydroxy- aryloxy, and arylthio substituents. The new compounds are not harmul to certain crop plants.

DESCRIPTION OF THE PREFERRED EMBODIMENT

I have invented novel compounds of the formula

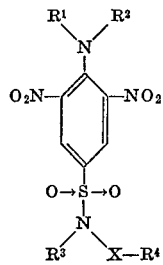

wherein
$R^1$ represents
(A) $C_1$–$C_6$ alkyl, optionally monosubstituted with
(1) methoxy,
(2) cyano,
(3) bromo, or
(4) chloro,
(B) $C_3$–$C_4$ alkenyl,
(C) $C_3$–$C_4$ alkynyl, or
(D) cyclopropylmethyl;
$R^2$ represents
(A) $C_1$–$C_6$ alkyl, optionally monosubstituted with
(1) methoxy,
(2) cyano,
(3) bromo, or
(4) chloro,
(B) $C_3$–$C_4$ alkenyl,
(C) $C_3$–$C_4$ alkynyl,
(D) cyclopropylmethyl, or
(E) hydrogen;

provided that $R^1$ and $R^2$ together contain no more than 8 carbon atoms; or $R^1$ and $R^2$ together with the nitrogen atom to which they are attached form
(A) piperidino,
(B) pyrrolidino,
(C) morpholino,
(D) aziridino,
(E) azetidino, or
(F) hexahydroazepino;
$R^3$ represents
(A) hydrogen, or
(B) methyl;
X represents
(A) oxygen, or
(B) sulfur;
$R^4$ represents
(A) hydrogen,
(B) benzyl, or
(C) phenyl, optionally monosubstituted with
(1) nitro, or
(2) halo;

provided that $R^4$ represents hydrogen only when X represents oxygen, and provided that $R^2$ represents hydrogen only when X represents oxygen.

In the above generic formula, the general chemical terms are used in the sense in which they are normally understood in the organic chemical art.

The terms $C_1$–$C_6$ alkyl, $C_3$–$C_4$ alkenyl, and $C_3$–$C_4$ alkynyl refer to groups such as methyl, hexyl, isopropyl, n-pentyl, t-butyl, allyl, methallyl, crotyl, propargyl, 2-butynyl, s-butyl, and ethyl.

The term halo refers to fluoro, chloro, bromo, and iodo.

The following compounds, which are exemplary but by no means exhaustive of my novel sulfanilamides, are named in order to make the scope of my invention more clear.

N⁴-cyclopropylmethyl-N¹-hydroxy-N¹-methyl-3,5-dinitro-N⁴-propylsulfanilamide
N⁴-ethyl-N¹-phenylthio-3,5-dinitro-N⁴-propargylsulfanilamide
N¹-benzyloxy-N⁴-butyl-N⁴-crotyl-N¹-methyl-3,5-dinitrosulfanilamide
N⁴-(3-butynyl)-N⁴-s-butyl-3,5-dinitro-N¹-phenylthiosulfanilamide
N¹-benzylthio-N⁴-methallyl-N¹,N⁴-dimethyl-3,5-dinitrosulfanilamide
N⁴-allyl-3,5-dinitro-N¹-(4-nitrophenoxy)-N⁴-propylsulfanilamide
N⁴-(2-hexyl)-N⁴-methyl-3,5-dinitro-N¹-phenylthiosulfanilamide
N¹-(4-chlorophenylthio)-3,5-dinitro-N⁴,N⁴-dipropylsulfanilamide
N⁴-t-butyl-N¹-methyl-3,5-dinitro-N⁴-propyl-N¹-(3-nitrophenylthio)sulfanilamide $N^4$-ethyl-$N^1$-(2-iodophenoxy)-$N^4$-phenyl-3,5-dinitro-
sulfanilamide
$N^1$-benzylthio-$N^1$-methyl-$N^4$,$N^4$-di(2-methoxyethyl)-3,5-
dinitrosulfanilamide
$N^1$-(2-chlorophenylthio)-$N^4$-(3-cyanopropyl)-$N^4$-(2-
chloroethyl)-3,5-dinitrosulfanilamide
4-morpholino-3,5-dinitro-N-phenoxybenzenesulfonamide
4-aziridino-N-methyl-N-(2-nitrophenoxy)-3,5-dinitro-
benzenesulfonamide
4-azetidino-N-benzyloxy-3,5-dinitrobenzenesulfonamide
N-(3-bromophenylthio)-4-hexahydroazepino-N-methyl-
3,5-dinitrobenzenesulfonamide
$N^4$-(2-bromoethyl)-$N^4$-(2-bromopropyl)-$N^1$-methyl-3,5-
dinitro-$N^1$-phenoxysulfonilamide
$N^4$-(2-chloroethyl)-$N^4$-cyclopropylmethyl-$N^1$-(2-nitro-
phenylthio)-3,5-dinitrosulfanilamide
$N^1$-(3-chlorophenoxy)-$N^1$-methyl-$N^4$-propargyl-$N^4$-iso-
propyl-3,5-dinitrosulfanilamide
$N^1$-benzylthio-$N^4$-(2-chloroethyl)-$N^4$-crotyl-3,5-dinitro-
sulfanilamide
$N^4$-allyl-$N^1$-(4-fluorophenoxy)-$N^1$,$N^4$-dimethyl-3,5-dini-
trosulfanilamide
N-(2-iodophenylthio)-3,5-dinitro-4-piperidinobenzene-
sulfanilamide
N-(2-bromophenoxy)-N-methyl-3,5-dinitro-4-pyrrolidino
benzenesulfonamide.

The preferred species of my invention are the follow-
ing compounds.

3,5-dinitro-$N^1$-phenylthio-$N^4$,$N^4$-dipropylsulfanilamide
$N^1$-methyl-3,5-dinitro-$N^1$-phenylthio-$N^4$,$N^4$-dipropyl-
sulfanilamide
$N^1$-benzyloxy-3,5-dinitro-$N^4$,$N^4$-dipropylsulfanilamide
3,5-dinitro-$N^1$-(2-nitrophenylthio)-$N^4$,$N^4$-dipropyl-
sulfanilamide
$N^1$-hydroxy-3,5-dinitro-$N^4$,$N^4$-dipropylsulfanilamide.

All of my novel sulfanilamides are made from 4-(sub-
stituted amino)-3,5-dinitrobenzenesulfonyl chlorides. The
4-amino group may be either mono- or disubstituted when
an $N^1$-oxy product is to be made; it is disubstituted when
the desired product is an $N^1$-arylthio compound. Such
compounds are well known in the organic chemical art,
and are readily obtainable or easily synthesized by chlo-
rination of a salt of the corresponding sulfonic acid with
$PCl_5$ in dichloroethane. All other reactants used in the
synthesis of my compounds are also known to the art.
My novel sulfanilamides are readily synthesized by one
skilled in the organic chemical art. The following general
methods of synthesis and specific preparative examples
are offered only to assure that all may obtain my com-
pounds.

My $N^1$-oxy sulfanilamides are produced by reacting the
starting benzenesulfonyl chloride at ambient or moderate-
ly elevated temperature with an appropriately-substituted
hydroxylamine. For example, an $N^1$-hydroxy-$N^1$-methyl
compound is produced from N-hydroxy-N-methylamine
as a reactant. An $N^1$-benzyloxy compound is produced
from benzyloxyamine. It is convenient to use the hy-
droxylamine in the form of a salt, especially the hydro-
chloride.

The amination reaction is carried out in an inert
reaction solvent at room or moderately elevated tem-
perature in the persence of an acid scavenger, which is
needed as a receptor for the HCl released by the reaction.
Pyridine is a convenient reaction solvent which also serves
as the acid scavenger. Lower alcohols, such as ethanol,
are also excellent reaction solvents for the amination.
Tertiary organic bases, such as triethylamine and trietha-
nolamine, and inorganic bases, such as sodium carbonate
and potassium hydroxide, are useful acid scavengers. Ex-
cess of the hydroxylamine itself may be used as the acid
scavenger if the hydroxylamine is used as the free base
rather than as a salt.

My $N^1$-arylthiosulfanilamides are made in two steps.
In the first step, the chlorine atom of the starting benzene-
sulfonyl chloride is replaced with an amino or methyl-
amino group by reaction with ammonia or methyl-
amine. Methylamine may be used either in the gaseous
phase or as the hydrochloride or other salt. In the second
step of the synthesis, a properly substituted sulfenyl chlo-
ride, of the general formula $R^4SCl$, is reacted with the
sulfanilamide formed in the first step. Both steps of the
synthesis of my $N^1$-arylthiosulfanilamides are HCl-releas-
ing reactions, and are conveniently carried out in the same
manner as is the amination described above for the syn-
thesis of my $N^1$-oxy sulfanilamides.

The first two preparative examples illustrate typical
synthesis of my $N^1$-oxy compounds.

EXAMPLE 1

$N^1$-hydroxy-$N^1$-methyl-3,5-dinitro-$N^4$,$N^4$-
dipropylsulfanilamide

A 2.5 g. portion of N-methyl-N-hydroxylamine hydro-
chloride was dissolved in 50 ml. of denatured ethanol,
and 10 ml. of 3N sodium hydroxide solution was added.
The reaction mixture was stirred at room temperature,
and 3.7 g. of 3,5-dinitro-4-dipropylaminobenzenesulfonyl
chloride was added slowly. The reaction mixture was
stirred for 1 hour after completion of the addition. The
reaction mixture was poured into ice water, and the prod-
uct was collected by filtration and dried under vacuum.
The dried crude product was crystallized from aqueous
ethanol. The yield was 1.1 g. of $N^1$-hydroxy-$N^1$-methyl-
3,5-dinitro-$N^4$,$N^4$-dipropylsulfanilamide, m.p. 125–128° C.
The elemental analysis was as follows.

|   | Percent |        |
|---|---------|--------|
|   | Calculated | Actual |
| C | 41.49 | 41.75 |
| H | 5.36  | 5.44  |
| N | 14.89 | 15.09 |

EXAMPLE 2

3,5-dinitro-$N^1$-phenoxy-$N^4$,$N^4$-dipropylsulfanilamide

A mixture of 3.5 g. of 3,5-dinitro-4-dipropylamino-
benzenesulfonyl chloride and 1.5 g. of phenoxyamine hy-
drochloride in 50 ml. of dry pyridine was stirred for 2
hours at room temperature. Then the reaction mixture
was stirred at 50° C. for 1 hour, and the mixture was
stirred into ice water. The aqueous mixture was extracted
with chloroform, and the chloroform layer was dried over
anhydrous magnesium sulfate. The dried organic layer
was evaporated to dryness under vacuum, leaving an
amorphous residue. The residue was dissolved in benzene
and passed through a 250 ml. of column of silica gel. The
product-containing fraction was mixed with petroleum
ether to precipitate the product. The yield was 1.1 g. of
3,5-dinitro-$N^1$-phenoxy-$N^4$,$N^4$-dipropylsulfanilamide, m.p.
94–97° C. The elemental analysis was as follows.

|   | Percent |        |
|---|---------|--------|
|   | Calculated | Actual |
| C | 49.31 | 49.18 |
| H | 5.00  | 5.10  |
| N | 12.78 | 12.96 |

The process of Examples 1 and 2 is effective, appropri-
ately modified, in the production of all of my $N^1$-oxy sub-
stituted compounds. For example, the following com-
pounds are made by the same general process.

$N^1$-benzyloxy - 3,5 - dinitro-$N^4$,$N^4$-dipropylsulfanilamide,
m.p. 121–124° C.
$N^1$-hydroxy - 3,5 - dinitro-$N^4$,$N^4$-dipropylsulfanilamide,
m.p. 157–158° C.

Example 3 below illustrates the first step of the syn-
thesis of my $N^1$-thio sulfanilamides.

EXAMPLE 3

3,5-dinitro-$N^4,N^4$-dipropylsulfanilamide

A 5 g. portion of 3,5-dinitro-4-dipropylaminobenzenesulfonyl chloride was reacted with 3.5 g. of 28 percent $NH_4OH$ in 150 ml. of benzene at reflux temperature with stirring for 3 hours. The reaction mixture was then mixed with 200 ml. of ethyl ether and filtered. The filtrate was evaporated to dryness under vacuum, the residue was dissolved in acetone, and the product was crystallized by the addition of petroleum ether to the acetone solution. The product was identified as 3,5-dinitro-$N^4,N^4$-dipropylsulfanilamide, m.p. 137–138° C., by NMR analysis.

The second step of the synthesis of my $N^1$-thio sulfanilamides is illustrated by Example 4 below.

EXAMPLE 4

3,5-dinitro-$N^1$-(2-nitrophenylthio)-$N^4,N^4$-dipropylsulfanilamide

A solution was made of 1.90 g. of 2-nitrobenzenesulfonyl chloride and 3.46 g. of 3,5-dinitro-$N^4,N^4$-dipropylsulfanilamide in 50 ml. of pyridine. The solution was stirred at room temperature for 30 minutes, and poured into ice water. The quenched mixture was extracted with chloroform, and the organic layer was evaporated to dryness under vacuum. The residue was taken up in acetonitrile and crystallized by evaporation of solvent to produce 1.2 g. of 3,5-dinitro-$N^1$-(2-nitrophenylthio)-$N^4,N^4$-dipropylsulfanilamide, m.p. 161–165° C. The product was identified by NMR analysis.

Other typical compounds of my invention which are made by appropriate modifications of the above process are the following.

3,5 - dinitro-$N^1$-phenylthio-$N^4,N^4$-dipropylsulfanilamide, m.p. 112–115° C.

$N^1$-methyl - 3,5 - dinitro-$N^1$-phenylthio-$N^4,N^4$-dipropylsulfanilamide, m.p. 98–100° C.

$N^1$-(2,4-dinitrophenylthio) - 3,5 - dinitro-$N^4,N^4$-dipropylsulfanilamide, m.p. 187–190° C.

I have proved the herbicidal efficacy of my new compounds by the following test method. Six parts by weight of the compound to be tested was dissolved in 94 parts by weight of 1:1 acetone:ethanol containing 2.5 percent of surfactants. One part by volume of the solution was then dispersed in 9 parts by volume of water.

Seeds of the test plants were planted in sandy soil in perforated galvanized steel pans. A compound to be tested for preemergence activity was sprayed on the soil the same day that the seeds were planted. When a postemergence herbicidal test was to be performed, the dispersion was sprayed evenly with an atomizer over the plants growing in the pan from 10 to 13 days after the seeds were planted. All pans were held in a greenhouse at 74–80° F. and received from 12 to 18 hours of light per day.

The treated plants were evaluated 12 to 13 days after treatment. Herbicidal effects were rated on a scale on which 0 indicates no injury and 4 indicates death of the plant.

The results of herbicidal tests of representative compounds of my invention are shown below.

EXAMPLE 5

3,5-dinitro-$N^1$-phenylthio-$N^4,N^4$-dipropylsulfanilamide

|  | 2 lbs./a., preemergence | 8 lbs./a., preemergence | 8 lbs./a., postemergence |
|---|---|---|---|
| Corn | 1 | 0 | 3 |
| Cotton | 0 | 1 | 1 |
| Soybean | 0 | 0 | 2 |
| Sugar beets | 1 | | |
| Cucumber | 0 | | |
| Rice | 2 | | |
| Crabgrass | 2 | 3 | |
| Pigweed | 2 | 3 | 2 |
| Foxtail | 3 | 3 | 2 |

EXAMPLE 6

3,5-dinitro-$N^1$-(2-nitrophenylthio)-$N^4,N^4$-dipropylsulfanilamide

|  | 2 lbs./a., preemergence | 8 lbs./a., preemergence | 8 lbs./a., postemergence |
|---|---|---|---|
| Corn | 0 | 0 | 2 |
| Cotton | 1 | 0 | 0 |
| Soybean | 1 | 0 | 1 |
| Sugar beets | 0 | | |
| Cucumber | 0 | | |
| Crabgrass | 3 | 4 | 1 |
| Pigweed | 2 | 3 | 2 |
| Foxtail | 3 | 3 | 2 |

The data presented above demonstrate that my sulfanilamides inhibit the growth of many weed species at rates which do not injure many crop species. Therefore, my sulfanilamides are useful as selective herbicides.

As illustrated by the examples above, some representatives of my sulfanilamides are postemergence herbicides, others are preemergence herbicides, and many are both. Postemergence use of my sulfanilamides is most effective when a formulation containing the sulfanilamide is applied to the aerial parts of the plant, especially to the leaves.

Preemergence use of my sulfanilamides is accomplished by applying the compound to a growth medium containing seeds of the plant to be inhibited. The compound is preferably incorporated in the growth medium. The compound prevents the germination of the seed in some instances, or kills the seedling as it grows through the treated growth medium before emergence or immediately thereafter.

My compounds may be used in the pure form by applying the compound to the plants or to their growth medium. It is more convenient, as is well known in the agricultural chemicals art, to use my compound in the form of an agricultural chemical formulation.

Agricultural formulations of my compounds are applied as either liquids or solids. Liquid compositions comprise water dispersions and emulsions of concentrated formulations containing my compound. Concentrated formulations are either solids known as wettable powders, or liquids known as emulsifiable concentrates.

Wettable powders comprise an intimate mixture of one of my compounds, an inert carrier, and surfactants. The inert carrier is a finely-powdered solid such as a clay. The surfactants are chosen from the nonionic and anionic surfactants.

Emulsifiable concentrates of my compounds comprise one of my compounds dissolved in a water-immiscible organic solvent containing emulsifiers. The emulsifiers are anionic, nonionic, or a mixture of both types. The organic solvent is usually chosen from among the aromatics and the petroleum fractions.

Solid formulations may be either dusts or granular formulations. Dust formulations of herbicides are rarely acceptable because of the risk of drift to areas where the herbicide should not be applied. Dusts are simple mixtures of one of my compounds with a finely-powdered, inexpensive solid such as a clay. Granular formulations comprise a granular inert carrier, typically coarsely ground clay from 0.1 to 3 mm. in particle size, on which is dispersed a solution of the sulfanilamide in an inexpensive solvent.

Preemergence applications of my compounds may be accomplished with any type of formulation. Postemergence applications cannot normally be accomplished with granular formulations, because of the difficulty in keeping a granular formulation in contact with the plant. All other types of formulations are appropriate for postemergence use.

Mixtures of pesticides, such as two or more herbicides or an herbicide and an insecticide, are conveniently used to allow treatment of an area for control of several crop pests by one application. The use of my sulfanilamides in such mixtures is feasible and is within the scope of my invention.

I claim:
1. A compound of the formula

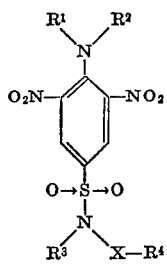

wherein
R¹ represents
  (A) $C_1$–$C_6$ alkyl,
  (B) $C_1$–$C_6$ alkyl monosubstituted with
    (1) methoxy,
    (2) cyano,
    (3) bromo, or
    (4) chloro,
  (C) $C_3$–$C_4$ alkenyl,
  (D) $C_3$–$C_4$ alkynyl, or
  (E) cyclopropylmethyl;
R² represents
  (A) $C_1$–$C_6$ alkyl,
  (B) $C_1$–$C_6$ alkyl, monosubstituted with
    (1) methoxy,
    (2) cyano,
    (3) bromo, or
    (4) chloro,
  (C) $C_3$–$C_4$ alkenyl,
  (D) $C_3$–$C_4$ alkynyl,
  (E) cyclopropylmethyl, or
  (F) hydrogen;
provided that R¹ and R² together contain no more than 8 carbon atoms; or
R¹ and R² together with the nitrogen atom to which they are attached form
  (A) piperidino,
  (B) pyrrolidino,
  (C) morpholino,
  (D) aziridino,
  (E) azetidino, or
  (F) hexahydroazepino;
R³ represents
  (A) hydrogen, or
  (B) methyl;
X represents
  (A) oxygen, or
  (B) sulfur;
R⁴ represents
  (A) hydrogen,
  (B) benzyl,
  (C) phenyl, or
  (D) phenyl monosubstituted with
    (1) nitro, or
    (2) halo;
provided that R⁴ represents hydrogen only when X represents oxygen, and provided that R² represents hydrogen only when X represents oxygen.

2. The compound of Claim 1 which is 3,5-dinitro-N¹-phenylthio-N⁴,N⁴-dipropylsulfanilamide.

3. The compound of Claim 1 which is N¹-methyl-3,5-dinitro-N¹-phenylthio-N⁴,N⁴-dipropylsulfanilamide.

4. The compound of Claim 1 which is N¹-benzyloxy-3,5-dinitro-N⁴,N⁴-dipropylsulfanilamide.

5. The compound of Claim 1 which is 3,5-dinitro-N¹-(2-nitrophenylthio)-N⁴,N⁴-dipropylsulfanilamide.

6. The compound of Claim 1 which is N¹-hydroxy-3,5-dinitro-N⁴,N⁴-dipropylsulfanilamide.

References Cited
UNITED STATES PATENTS

| | | | |
|---|---|---|---|
| 3,367,949 | 2/1968 | Soper | 71—103 |
| 3,371,106 | 2/1968 | Berliner et al. | 71—118 |
| 3,555,055 | 1/1971 | Kaplan | 260—397.7 R |
| 3,672,864 | 6/1972 | Maravetz | 71—103 |
| 3,746,727 | 7/1973 | Pilgrim et al. | 260—397.7 R |

NORMA S. MILESTONE, Primary Examiner
S. D. WINTERS, Assistant Examiner

U.S. Cl. X.R.
71—88, 94, 95, 103; 260—239.6, 239.7, 239.8

UNITED STATES PATENT OFFICE
CERTIFICATE OF CORRECTION

Patent No. 3,840,569      Dated October 8, 1974

Inventor(s) James R. Beck

It is certified that error appears in the above-identified patent and that said Letters Patent are hereby corrected as shown below:

Column 1, line 63, the left-hand arrow should point toward the "O" not toward the "S".

Column 3, line 1, "phenyl" should read --pentyl--.

Column 3, line 14, "phenoxysulfonilamide" should read --phenoxysulfanilamide--.

Column 3, line 24, "sulfanilamide" should read --sulfonamide--.

Column 3, line 25, there should be a hyphen after the word "pyrrolidino".

Column 3, line 64, "persence" should read --presence--.

Column 4, line 14, "synthesis" should read --syntheses--.

Column 5, lines 21-22, "nitrobenzenesulfonyl" should read --nitrobenzenesulfenyl--.

Column 7, line 10, the left-hand arrow should point toward the "O" not toward the "S".

Signed and sealed this 17th day of December 1974.

(SEAL)
Attest:

McCOY M. GIBSON JR.
Attesting Officer

C. MARSHALL DANN
Commissioner of Patents